United States Patent [19]

Nandu et al.

[11] Patent Number: 5,298,533

[45] Date of Patent: Mar. 29, 1994

[54] POLYMER COMPOSITIONS FOR CONTACT LENSES

[75] Inventors: Mahendra P. Nandu, Rochester; Jay F. Kunzler, Canandaigua, both of N.Y.

[73] Assignee: Bausch & Lomb Incorporated, Rochester, N.Y.

[21] Appl. No.: 984,169

[22] Filed: Dec. 2, 1992

[51] Int. Cl.$^5$ .................. C08F 220/28; C08F 220/26
[52] U.S. Cl. .................. 523/106; 526/304; 526/307.5; 526/309; 522/174; 522/175
[58] Field of Search .................. 526/304, 307.5; 522/174, 175; 523/106, 309

[56] References Cited

U.S. PATENT DOCUMENTS

| | | | |
|---|---|---|---|
| 3,402,153 | 9/1968 | Jaeger et al. | 260/78.5 |
| 4,035,330 | 7/1977 | Schultz | 260/29.6 |
| 4,182,822 | 1/1978 | Chang | 526/264 |
| 4,275,183 | 6/1981 | Kuzma | 526/303 |
| 4,328,148 | 5/1982 | Kuzma | 524/555 |
| 4,343,927 | 8/1982 | Chang | 526/262 |
| 4,388,436 | 6/1983 | Chen | 524/553 |
| 4,465,794 | 8/1984 | Kuzma | 523/106 |
| 4,529,747 | 7/1985 | Kato et al. | 523/108 |
| 4,761,438 | 8/1988 | Komiya et al. | 523/106 |
| 4,829,126 | 5/1989 | Nakajima et al. | 525/283 |
| 4,954,587 | 9/1990 | Mueller | 526/245 |
| 5,006,622 | 4/1991 | Kunzler | 526/309 |
| 5,011,275 | 4/1991 | Mueller | 351/160 |
| 5,073,616 | 12/1991 | Futamura et al. | 526/264 |
| 5,104,954 | 4/1992 | Mueller | 526/307.7 |

*Primary Examiner*—Joseph L. Schofer
*Assistant Examiner*—Mark Nagumo
*Attorney, Agent, or Firm*—John E. Thomas; Craig E. Larson

[57] ABSTRACT

Copolymers useful as a contact lens material are prepared from a mixture comprising:
(a) an N,N-dialkyl(meth)acrylamide monomer; and
(b) a monomer represented by the formula:

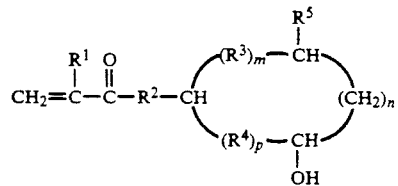

wherein:

$R^1$ is methyl or hydrogen;

$R^2$ is —O— or —NH—;

$R^3$ and $R^4$ are independently a divalent radical selected from the group consisting of —$CH_2$—, —CHOH— and —$CHR^6$—;

$R^5$ and $R^6$ are independently a branched $C_3$–$C_8$ alkyl group; and n is an integer of at least 1, and m and p are independently 0 or an integer of at least 1, provided that the sum of m, p and n is 2, 3, 4 or 5.

3 Claims, No Drawings

POLYMER COMPOSITIONS FOR CONTACT LENSES

BACKGROUND OF THE INVENTION

1. Field of the Invention

The present invention relates to polymeric compositions useful as a contact lens material, and particularly as a hydrogel contact lens material.

2. Description of the Related Art

Conventional hydrogel contact lenses are prepared from monomeric mixtures predominantly containing at least one hydrophilic monomer. Representative hydrophilic monomers include: unsaturated carboxylic acids, such as (meth)acrylic acids; (meth)acrylic substituted alcohols, such as 2-hydroxyethyl methacrylate; vinyl lactams, such as N-vinyl pyrrolidone; and (meth)acrylamides, such as methacrylamide, N-methylmethacrylamide and N,N-dimethylacrylamide. (As used herein, the term "(meth)" indicates optional methyl substitution. Thus, a term such as "(meth)acrylate" designates both acrylates and methacrylates). A hydrogel is a hydrated cross-linked polymeric system that contains water in an equilibrium state. The monomeric mixture usually includes a crosslinking agent (a crosslinker being defined as a monomer having multiple polymerizable functionalities), although one of the hydrophilic monomers may function as the crosslinker.

Oxygen transmissibility of hydrogel contact lenses relates to the water content of the hydrated lens material and the thickness of the lens. Thus, oxygen transmissibility can be increased by increasing the water content or decreasing the lens thickness. However, in general, an increase in water content or a decrease in lens thickness affects the mechanical properties of the lens, such as decreasing the tear strength of the lens.

U.S. Pat. No. 5,006,622 (Kunzler et al.) discloses a class of strengthening monomers which can be copolymerized with hydrophilic monomers for hydrogel contact lenses. Disclosed strengthening monomers include: 4-t-butyl-2-hydroxycyclohexyl methacrylate; 4-t-butyl-2-hydroxycyclopentyl methacrylate; 4-t-butyl-2-hydroxycyclohexyl methacrylamide; 6-isopentyl-3-hydroxycyclohexyl methacrylate; and 2-isohexyl-5-hydroxycyclopentyl methacrylamide. Disclosed hydrophilic monomers include: 2-hydroxyethyl methacrylate; N-(2-hydroxyethyl)-methacrylamide; N-vinyl-2-pyrrolidone; glyceryl methacrylate; N-methacryloyl glycine; (2-hydroxy-3-methacryloylpropyl)-4-methoxy phenylether; and 2-hydroxycyclohexyl methacrylate. The patent reports that best results were obtained from formulations employing N-vinyl-2-pyrrolidone (NVP) as the hydrophilic agent, in that these formulations possessed an optimum combination of water content, oxygen permeability levels and mechanical properties.

While these formulations provide hydrogels exhibiting a desirable combination of mechanical properties, water content and oxygen permeability, the incorporation of a vinyl lactam, such as NVP, in the monomeric mixture as a hydrophilic monomer can affect the processabililty of the monomeric mixture. For example, difficulties can be encountered in polymerizing formulations containing vinyl lactams in that the formulations require a longer cure time to effect polymerization or crosslinking. Such formulations generally require application of heat to complete polymerization or crosslinking, whereas it is often desirable to polymerize contact lens materials solely by photopolymerization. Additionally, phase separation of the monomers is more likely to occur when vinyl lactams are admixed with monomers having (meth)acrylate or (meth)acrylamide functionality.

SUMMARY OF THE INVENTION

The present invention relates to copolymers useful as a contact lens material which are prepared from a mixture comprising:

(a) an N,N-dialkyl(meth)acrylamide monomer; and (b) a monomer represented by the formula:

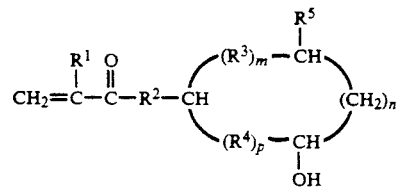

wherein:

$R^1$ is methyl or hydrogen;

$R^2$ is —O— or —NH—;

$R^3$ and $R^4$ are independently a divalent radical selected from the group consisting of —$CH_2$—, —CHOH— and —$CHR^6$—;

$R^5$ and $R^6$ are independently a branched $C_3$–$C_8$ alkyl group; and n is an integer of at least 1, and m and p are independently 0 or an integer of at least 1, provided that the sum of m, p and n is 2, 3, 4 or 5.

Additionally, the invention relates to hydrogel shaped articles, preferably in the form of a contact lens, which are the hydrated polymerization product of these mixtures.

The incorporation of the N,N-dialkyl(meth)acrylamide monomer as a hydrophilic monomer avoids the aforementioned problems associated with vinyl lactams such as NVP. Additionally, it has been found that the strengthening monomers disclosed in U.S. Pat. No. 5,006,622 can be effectively copolymerized with N,N-dialkyl(meth)acrylamides in order to improve mechanical properties without deleteriously affecting other properties. The resultant copolymers provide optically clear hydrogels which exhibit a desired combination of properties including a relatively high water content and oxygen permeability, hydrolytic stability and satisfactory mechanical properties.

DETAILED DESCRIPTION OF THE INVENTION

The invention relates to copolymers useful as a contact lens material, particularly a hydrogel contact lens material. The copolymers comprise the polymerization product of a mixture comprising the following essential components:

(a) an N,N-dialkyl(meth)acrylamide monomer; and (b) a monomer represented by formula (I):

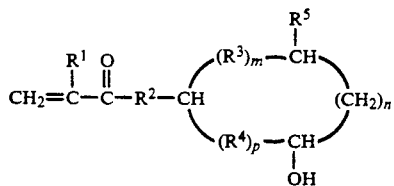

wherein:
R¹ is methyl or hydrogen;
R² is —O— or —NH—;
R³ and R⁴ are independently a divalent radical selected from the group consisting of —CH₂—, —CHOH— and —CHR₆—;
R⁵ and R⁶ are independently a branched C₃-C₈ alkyl group; and
n is an integer of at least 1, and m and p are independently 0 or an integer of at least 1, provided that the sum of m, p and n is 2, 3, 4 or 5.

Preferred monomers (a) may be represented by the following formula:

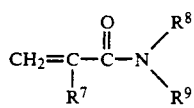

wherein R⁷ is methyl or hydrogen, and R⁸ and R⁹ are independently a C₁-C₄ alkyl group. Representative monomers include N,N-dimethylacrylamide (DMA), N,N-diethylacrylamide, N,N-dimethylmethacrylamide, and N-methyl-N'-ethylacrylamide, with DMA being especially preferred.

In addition to N,N-dialkyl(meth)acrylamides, analogous acrylamide monomers are known as hydrogel contact lens materials, such as methylacrylamide and N-methyl methacrylamide. It has been found that copolymers according to the present invention, prepared from monomeric mixtures including the N,N-dialkyl (meth)acrylamide as a hydrophilic monomer, are hydrolytically stable, whereas copolymers prepared from mixtures including acrylamide monomers lacking the N,N-dialkyl substitution are hydrolytically unstable.

Representative monomers (b) include: 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; and 2-isohexyl-5-hydroxycyclopentyl methacrylamide. Preferred monomers (b) include compounds of formula (I) wherein R³ is —CH₂—, m is 1 or 2, p is 0, and the sum of m and n is 3 or 4. TBE and TBA are especially preferred.

Applicants discovered that monomer (b) can be copolymerized with the N,N-dialkyl(meth)acrylamide monomer (a) in order to improve mechanical properties of the resultant copolymer, including tear strength. Additionally, it has been found that monomeric mixtures comprising the monomers (a) and (b) can be cured effectively at room temperature and without encountering deleterious effects from phase separation of the monomers.

The copolymers of the present invention generally have a much lower modulus of elasticity than the copolymers disclosed in U.S. Pat. No. 5,006,622. Despite having the lower modulus of elasticity, the copolymers of this invention still exhibit sufficient mechanical strength due to the high tear strength.

It is preferred that monomer (b) is present at 5 to 50 parts by weight of total monomeric components, and more preferably, at 10 to 40 parts by weight since mechanical properties such as tear strength can be significantly improved by employing at least 10 parts by weight of monomer (b). When a higher tear strength is desired, it is preferred that monomer (b) is included in at least 15 parts by weight of total monomeric components.

The monomeric mixtures from which the copolymers are prepared may include one or more hydrophilic monomers known in the art as useful for contact lens materials in addition to the N,N-dialkyl(meth)acrylamide monomer (a). It is understood that said additional hydrophilic monomer is defined as different from, or exclusive of, monomers (a) and (b).

According to preferred embodiments, the additional hydrophilic monomer excludes vinyl lactams such as NVP in order to avoid the aforementioned difficulties associated with polymerizing mixtures containing such monomers. Also, it is preferred that the additional hydrophilic monomer is a monomer containing a (meth)acrylate radical as the polymerization functional group.

Representative hydrophilic monomers include: (meth)acrylic substituted carboxylic acids, such as acrylic acid or methacrylic acid; (meth)acrylic substituted alkanes or cycloalkanes, such as methyl methacrylate and cyclohexyl methacrylate; (meth)acrylic substituted alcohols, such as 2-hydroxyethyl methacrylate (HEMA), 2-hydroxycyclohexyl methacrylate and glyceryl methacrylate; and (meth)acrylic substituted ethers, such as (2-hydroxy-3-methacryloylpropyl)-4-methoxy phenylether, with HEMA being especially preferred.

It is preferred that the N,N-dialkyl(meth)acrylamide monomer (a) is included in the monomeric mixture at 20 to 70 parts by weight of total monomeric components, with 25 to 60 parts by weight being especially preferred. Hydrophilic monomers other than monomer (a) may be present at 0 to 70 parts by weight of total monomers in the mixture, although it is preferred that the additional hydrophilic monomers are included at 5 to 60 parts by weight, and more preferably at 20 to 50 parts by weight. According to preferred embodiments, the monomeric mixture includes at least 40 parts by weight, and more preferably at least 50 parts by weight, of total hydrophilic monomeric components (i.e., the N,N-dialkyl (meth)acrylamide monomers and any additional hydrophilic monomers) so that the resultant copolymer is predominantly hydrophilic and wettable for use as a contact lens material.

The monomeric mixtures may further include minor amounts of a crosslinking monomer having at least two polymerizable functional groups, and minor amounts of a polymerization initiator. Crosslinking agents are known in the art, and representative crosslinking agents include allyl methacrylate and ethylene glycol dimethyacrylate (EGDMA). The initiator is preferably a free radical ultraviolet polymerization initiator such as benzoin methyl ether, BME. Other initiators are known in the art.

A diluent may be added to the monomeric components, wherein the diluent is defined as a substance which is substantially nonreactive with the monomers in the monomeric mixture. The diluent may be added to the monomeric mixture at 0 to 50 parts by weight, based on weight of monomeric components in the mixture, more preferably, at 5 to 40 parts by weight, with 10 to 30 parts by weight being more preferred. The diluent can serve to minimize any incompatibility of the components in the initial monomeric mixture and further alleviate any problems attributed to phase separation. Also, the diluent may lower the glass transition temperature of the reacting polymeric mixture which allows for a more efficient curing process. Water may be used as the diluent, or alternately, an organic diluent may be employed, including: monohydric alcohols, with $C_6$–$C_{10}$ straight-chained aliphatic monohydric alcohols, such as n-hexanol and n-nonanol, being especially preferred; diols, such as ethylene glycol; polyols, such as glycerin; ethers, such as dipropylene glycol and diethylene glycol monobutyl ether; ketones, such as methyl ethyl ketone; esters, such as methyl enanthate, ethylene carbonate and glyceryl triacetate; and hydrocarbons. Other suitable diluents will be apparent to a person of ordinary skill in the art.

An especially preferred class of copolymers are produced by polymerizing a mixture consisting essentially of:

(a) 20 to 20 parts by weight of the N,N-dialkyl(meth-)acrylamide monomer;

(b) 10 to 50 parts by weight of a monomer represented by the formula:

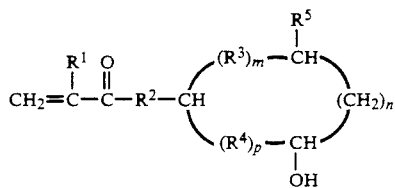

wherein $R^1$, $R^2$, $R^3$, $R^4$, $R^5$, $R^6$, n, m and p are as previously defined;

(c) 10 to 60 parts by weight of the additional hydrophilic monomer (exclusive of components (a) and (b));

(d) 0.01 to 5 parts by weight of a crosslinking monomer having at least two polymerizable functional groups; and (e) 0.01 to 5 parts by weight of a polymerization initiator;

wherein the amounts are based on 100 parts by weight of components (a), (b), (c), (d) and (e). Optionally, a diluent is added to the mixture at 0 to 50 parts by weight per 100 parts by weight of components (a), (b), (c), (d) and (e).

The present invention further includes a hydrogel shaped article in the form of a contact lens which is the hydrated polymerization product of the previously described monomeric mixtures. The copolymers of the present invention provide contact lenses which are hydrolytically stable, biologically compatible and optically clear. Hydrolytic stability indicates that the contact lenses do not undergo chemical degradation and maintain substantially the same water content over time. Preferably, the hydrated contact lenses exhibit the following characteristics: a water content of at least 50%, and more preferably, at least 60%, to provide good oxygen transport; and a tear strength of at least 3.0 g/mm thickness to prevent damage to the lens from handling.

EXAMPLES 1 TO 3

Copolymers of the Invention

A series of mixtures was prepared from N,N-dimethylacrylamide (DMA) (50 parts by weight, pbw), 4-t-butyl-2-hydroxycyclohexyl methacrylate (TBE) (20 pbw) and 2-hydroxyethyl methacrylate (HEMA) (15 pbw). Additionally, the mixture of Example 1 employed 15 pbw of triacetin (glyceryl triacetate), the mixture of Example 2 employed 15 pbw of dipropylene glycol, and the mixture of Example 3 contained no diluent. To these mixtures were added 0.34 pbw EGDMA, 0.17% BME and 0.01% color additive.

The resultant monomeric mixtures were cast between two silane-treated glass plates separated by Teflon ™ gaskets having a thickness of about 0.2 mm and cured under ultraviolet light at room temperature for about 2 hours. The cured films were removed from the glass plates and extracted with water, followed by hydration in buffered saline. The modulus of elasticity, tensile strength, percent elongation and tear initiation of the hydrated films were measured following modified ASTM-D 1708 or ASTM-D 1938 methods. Subsequently, following extraction and hydration, the films were heated in buffered saline for days at 80° C. to test hydrolytic stability.

The films were hydrolytically stable even with the prolonged exposure to heat. The results are summarized in Table 1, including mechanical properties of the hydrated films following hydration and prior to heating.

TABLE 1

|  | Example | | |
| --- | --- | --- | --- |
|  | 1 | 2 | 3 |
| % Water Before Heating | 67.26 | 67.20 | 70.10 |
| % Water (5 Days) | 67.95 | 66.16 | 71.04 |
| Elasticity Modulus (g/mm$^2$) | 20.0 | 18.0 | 17.0 |
| Tear Strength (g/mm thickness) | 3.0 | 4.0 | 3.0 |
| Tensile (g/mm$^2$) | 33.0 | 32.0 | 30.0 |
| % Elongation | 200 | 210 | 205 |

EXAMPLES 4 AND 5

Copolymers of the Invention

A series of mixtures was prepared as in Example 1 from DMA, TBE and HEMA, with the parts by weight of the monomers listed in Table 2. Additionally, the mixtures contained 10 pbw water as a diluent, EGDMA (0.34 pbw), BME (0.17%) and a color additive (0.01%). Films were obtained from the resultant admixtures following the procedure of Example 1, including heating in buffered saline for 14 days to test hydrolytic stability.

TABLE 2

|  | Example | |
| --- | --- | --- |
|  | 4 | 5 |
| HEMA | 35 | 25 |
| DMA | 35 | 40 |
| TBE | 15 | 20 |
| % Water Before Heating | 57.6 | 58.7 |
| % Water (3 days) | 55.6 | 59.2 |
| % Water (5 days) | 55.8 | 59.6 |
| % Water (7 days) | — | 59.4 |
| % Water (14 days) | 58.6 | 60.2 |

COMPARATIVE EXAMPLES 1 AND 2

A series of mixtures was prepared as in Example 1 for comparative purposes from an acrylamide monomer (N-methylmethacrylamide (NMA) or methacrylamide (MA)), HEMA, glycerin (14.5 pbw), EGDMA (0.34 pbw), BME (0.17%) and a color additive (0.006%). It is noted that the mixtures employed NMA or MA in place of DMA as in Examples 1 to 5. The parts by weight of the monomers are given in Table 3. Films were obtained from the resultant admixtures following the procedure of Example 1, and heated in buffered saline at 80° C. for 14 days.

TABLE 3

|  | Example | |
| --- | --- | --- |
|  | C1 | C2 |
| HEMA | 70 | 65 |
| NMA | 15 | 15 |
| MA | — | 5 |
| Glycerin | 14.5 | 14.5 |
| % Water Before Heating | 57.2 | 61.8 |
| % Water (3 days) | 45.5 | 44.2 |
| % Water (5 days) | — | 42.9 |
| % Water (7 days) | 47.7 | — |
| % Water (14 days) | 44.7 | 46.4 |

The data summarized in Tables 1 to 3 demonstrate that copolymers of the present invention, which employ the N,N-dialkyl(meth)acrylamide monomer, are hydrolytically stable, whereas copolymers containing the corresponding non-substituted acrylamides or mono-substituted acrylamides are not sufficiently hydrolytically stable.

EXAMPLES 6 TO 13

Copolymers of the Invention

A series of mixtures was prepared from DMA, TBE, HEMA, glycerin (14.5 pbw), EGDMA (0.34 pbw), BME (0.17%) and a color additive (0.006%). The parts by weight of the monomers present in each mixture are given in Table 4.

The resultant monomeric mixtures were cast between two silane-treated glass plates following the procedure of Example 1 and cured under ultraviolet light at room temperature for two hours. Following extraction with water and hydration in buffered saline, mechanical properties of the hydrated films were measured. The results are summarized in Table 4.

TABLE 4

|  | Example | | | | | | | |
| --- | --- | --- | --- | --- | --- | --- | --- | --- |
|  | 6 | 7 | 8 | 9 | 10 | 11 | 12 | 13 |
| HEMA | 45 | 40 | 35 | 40 | 35 | 30 | 25 | 45 |
| DMA | 30 | 30 | 30 | 35 | 35 | 35 | 45 | 35 |
| TBE | 10 | 15 | 20 | 10 | 15 | 20 | 15 | 5 |
| Elasticity Modulus (g/mm$^2$) | 20 | 35 | 220 | 20 | 25 | 100 | 21 | 23 |
| Tensile (g/mm$^2$) | 25 | 65 | 95 | 30 | 60 | 140 | 34 | 20 |
| Tear Strength (g/mm thickness) | 6.4 | 17 | 40 | 3.7 | 10 | 25 | 5.0 | 1.8 |
| % Elongation | 225 | 323 | 200 | 210 | 320 | 305 | 225 | 123 |
| % Water | 60 | 55 | 50 | 65 | 60 | 55 | 69 | 71 |

COMPARATIVE EXAMPLES 3 TO 6

A series of mixtures was prepared as in Example 6 for comparative purposes from DMA, HEMA and a diluent (hexanol or glycerin), with the parts by weight of these components listed in Table 5. Additionally, the mixtures included EGDMA (0.34 pbw), BME (0.17%) and a color additive (0.006%). It is noted that the mixtures did not include a monomer such as TBE. Films were obtained from the resultant admixtures following the procedure of Example 6, and the results are summarized in Table 5.

TABLE 5

|  | Example | | | |
| --- | --- | --- | --- | --- |
|  | C3 | C4 | C5 | C6 |
| HEMA | 70 | 70 | 65 | 65 |
| DMA | 15 | 15 | 20 | 20 |
| Hexanol | 14.5 | — | 14.5 | — |
| Glycerin | — | 14.5 | — | 14.5 |
| Elasticity Modulus (g/mm$^2$) | 26 | 25 | 11 | 23 |
| Tensile (g/mm$^2$) | 22 | 27 | 15 | 22 |
| Tear Strength (g/mm thickness) | 3.5 | 2.9 | 3.7 | 2.7 |
| % Elongation | 135 | 176 | 202 | 144 |
| % Water | 54.9 | 55.2 | 64.9 | 61.9 |

The data summarized in Tables 4 and 5 demonstrate that TBE can be copolymerized with DMA to improve mechanical properties of the resultant copolymers. Additionally, the incorporation of the strengthening monomer did not deleteriously affect other properties of the copolymers such as water content, and the films were curable at ambient temperature.

EXAMPLES 14 AND 15

In separate experiments, films corresponding to those of Examples 11 and 13, respectively, were heated at 121° C. in buffered saline solution for 0.5 hour to test hydrolytic stability. The film of Example 14 had a water content of 57% after heating, and the film of Example 15 had a water content of 71% after heating. The tests confirmed hydrolytic stability of these copolymers.

EXAMPLES 16 TO 21

Contact Lenses of the Invention

A series of mixtures was prepared from DMA, TBE, HEMA and glycerin. The amounts of these components, in parts by weight, are given in Table 6. To each mixture was added 0.34 pbw EGDMA, 0.17% BME and 0.01% of a color additive. Samples of the mixtures were injected onto a clean polypropylene concave mold section (for the anterior lens surface), and then covered with a convex polypropylene mold section (for the posterior lens surface). After pressing the molds together, the mold assemblies containing monomer mix were exposed to UV light for about 30 minutes at room temperature. The molds were opened mechanically, the cured contact lenses were released from the mold section in warm water, and then the lenses were extracted with water and hydrated in buffered saline. The mechanical properties of the lens lots were evaluated following the general procedure of Example 1. The results are summarized in Table 6.

TABLE 6

|  | Example | | | | | |
|---|---|---|---|---|---|---|
|  | 16 | 17 | 18 | 19 | 20 | 21 |
| HEMA | 35 | 28 | 30 | 23 | 15 | 18 |
| DMA | 35 | 40 | 40 | 45 | 50 | 50 |
| TBE | 15 | 17 | 15 | 17 | 20 | 17 |
| Glycerin | 15 | 15 | 15 | 15 | 15 | 15 |
| Elasticity Modulus (g/mm$^2$) | 22 | 23 | 19 | 18 | 30 | 20 |
| Tensile (g/mm$^2$) | 23 | 23 | 18 | 16 | 36 | 23 |
| Tear Strength (g/mm thickness) | 6.8 | 5.7 | 4.2 | 4.2 | 5.7 | 3.2 |
| % Elongation | 190 | 175 | 160 | 145 | 165 | 165 |
| % Water | 59.3 | 62.5 | 64.0 | 66.3 | 68.2 | 70.6 |

EXAMPLES 22 TO 23

Contact Lens of the Invention

Monomeric mixtures corresponding to those employed in Examples 1 and 2 and 3, respectively, were cast into contact lenses following the procedure of Example 16. Mechanical properties of the lens lots are reported in Table 7.

TABLE 7

|  | Example | |
|---|---|---|
|  | 22 | 23 |
| Elasticity Modulus (g/mm$^2$) | 26.0 | 25.0 |
| Tear Strength (g/mm thickness) | 4.2 | 4.7 |
| Tensile (g/mm$^2$) | 23.0 | 22.0 |

TABLE 7-continued

|  | Example | |
|---|---|---|
|  | 22 | 23 |
| % Elongation | 167 | 170 |

While certain preferred embodiments have been described, it is understood that the invention is not limited thereto and modifications and variations would be evident to a person of ordinary skill in the art.

We claim:

1. A hydrogel shaped article which is the hydrated polymerization product of a mixture consisting of:
   (a) N,N-dimethylacrylamide;
   (b) at least one monomer represented by the formula:

$$CH_2=\overset{R^1}{\underset{}{C}}-\overset{O}{\underset{}{\overset{\|}{C}}}-R^2-CH\underset{(R^4)_p-CH}{\overset{(R^3)_m-CH}{\diagup\diagdown}}\underset{\diagdown\diagup}{(CH_2)_n}\\ \qquad\qquad\qquad\qquad\qquad \overset{R^5}{\underset{OH}{|}}$$

wherein:
   $R^1$ is methyl or hydrogen;
   $R^2$ is —O— or —NH—;
   $R^3$ and $R^4$ are independently a divalent radical selected from the group consisting of —CH$_2$—, —CHOH— and —CHR$^6$—;
   $R^5$ and $R^6$ are independently a branched C$_3$–C$_8$ alkyl group; and
   n is an integer of at least 1, and m and p are independently 0 or an integer of at least 1, provided that the sum of m, p and n is 2, 3, 4 or 5;
   (c) 2-hydroxyethyl methacrylate;
   (d) at least one crosslinking monomer;
   (e) at least one polymerization initiator; and optionally,
   (f) a diluent.

2. The article of claim 1, wherein monomer (b) is 4-t-butyl-2-hydroxycyclochexyl methacrylate.

3. The article of claim 1, wherein said article is shaped as a contact lens.

* * * * *

UNITED STATES PATENT AND TRADEMARK OFFICE
CERTIFICATE OF CORRECTION

PATENT NO. : 5,298,533
DATED : Mar. 29, 1994
INVENTOR(S) : Mahendra P. Nandu et al It is certified that error appears in the above-indentified patent and that said Letters Patent is hereby corrected as shown below:

In column 5, line 23 change "20 to 20" to -- 20 to 70 --.

In column 6, line 23, change "saline for days" to -- saline for 5 days --.

In column 9, line 33, change "Examples 1 and 2 and 3" to -- Examples 2 and 3 --.

Signed and Sealed this

Nineteenth Day of July, 1994

Attest:

BRUCE LEHMAN

*Attesting Officer*        *Commissioner of Patents and Trademarks*